United States Patent [19]

Huvey

[11] Patent Number: 5,780,075
[45] Date of Patent: Jul. 14, 1998

[54] MANDREL FOR FILAMENT WINDING - APPLICATION TO THE MANUFACTURE OF CURVED PROFILES

[75] Inventor: Michel Huvey, Bougival, France

[73] Assignee: Institut Francais du Petrole, France

[21] Appl. No.: 675,873

[22] Filed: Jul. 5, 1996

Related U.S. Application Data

[63] Continuation of Ser. No. 358,947, Dec. 19, 1994, abandoned.

[30] Foreign Application Priority Data

Dec. 20, 1993 [FR] France .................... 9315409

[51] Int. Cl.[6] .................... B29C 33/48
[52] U.S. Cl. .................... 425/403; 428/36.1; 428/36.3; 156/172; 156/425; 264/313; 249/63
[58] Field of Search .................... 425/403; 156/172, 156/425; 428/254, 295, 36.3, 36.1; 264/313; 249/63

[56] References Cited

U.S. PATENT DOCUMENTS

| | | | |
|---|---|---|---|
| 3,141,052 | 7/1964 | Labash, Jr. | 264/219 |
| 4,581,263 | 4/1986 | Lukas | 428/295 |
| 5,022,845 | 6/1991 | Charlson et al. | 425/403 |

FOREIGN PATENT DOCUMENTS 0 087 851   9/1983   European Pat. Off. .

OTHER PUBLICATIONS

Database WPI, Week 8721, Derwent Publications Ltd., London, AN 87-148321 (abstract of JP-A-62 087 332 to Hitachi Chemical KK of Apr. 21, 1987).

*Primary Examiner*—Laurie Scheiner
*Attorney, Agent, or Firm*—Millen, White, Zelano & Branigan, P.C.

[57] ABSTRACT

The present invention relates to a mandrel for manufacturing a part made from a composite material according to the filament winding technique.

The mandrel includes a composite material layer whose threads are wound circumferentially round a metallic casing.

The overall thermal expansion of the mandrel according to the invention is close to the expansion of the reinforcing fibers of the parts manufactured on the mandrel.

The invention further relates to a use of the mandrel for manufacturing curved elongated profiles.

18 Claims, 1 Drawing Sheet

MANDREL FOR FILAMENT WINDING - APPLICATION TO THE MANUFACTURE OF CURVED PROFILES

This application is a continuation of application Ser. No. 08/358,947, filed Dec. 19, 1994, now abandoned.

BACKGROUND OF THE INVENTION

The present invention relates to an improved mandrel for manufacturing parts made from a composite material with good mechanical characteristics.

Patents FR-2,596,695 and FR-2,312,356 describe means and methods for manufacturing parts made from resin and reinforcing fibers by filling a mold wound helically on a mandrel or drum. Filling of the mold with resin-coated fibers is performed by filament winding. To that effect the mandrel is rotated about its axis. When winding is completed, the assembly consisting of the mandrel, the mold on the mandrel and the composite parts is brought up to a sufficient temperature to stabilize the fibers coating resin.

The thermal expansion of the mandrel provides a diameter increase of the mandrel while the resin is still in the process of being stabilized, which means that its viscosity is not low enough yet to act against fiber displacements.

If the thermal expansion coefficient of the reinforcing fibers is lower than the thermal expansion coefficient of the mandrel, the fibers move within the mold since the mold size increases more than that of the fibers. This effect consequently modifies the distribution homogeneity of the resin-coated fibers.

This drawback also appears when tubes made from a composite material are manufactured by winding resin-coated fibers on a mandrel type support.

The problem of the homogeneity of the material making up the composite part, such as an elongated profile of helical shape or a tube, is not a tensile strength problem, but mainly a problem of fatigue and aging strength.

Aging strength in the presence of water, for example for composites made from glass fibers and resin, is all the less high as the resin content is low. In fact a very thin resin layer between two fibers promotes interface separations under the effect of mechanical or thermal stresses. Bare glass is very easily affected by water. Besides, bare fibers coming into contact with each other break by erosion, hence the poor resistance to fatigue of composites too rich in reinforcing fibers. It may be deduced therefrom that a sufficient resin mat is necessary to separate the fibers.

SUMMARY OF THE INVENTION

The present invention thus relates to a mandrel for manufacturing by filament winding parts made from resin reinforced by reinforcing fibers. The mandrel includes a composite material layer comprising threads arranged substantially circumferentially with respect to the axis of rotation of said mandrel.

The thickness of the layer and the nature of the threads making it up may be so determined that the overall thermal expansion coefficient of said mandrel is close to the thermal expansion coefficient of said fibers reinforcing said parts. The overall thermal expansion coefficient of the mandrel is understood to be an apparent thermal expansion coefficient which takes account of the whole of the materials constituting the mandrel whose temperature behaviour is represented by said overall expansion coefficient.

The mandrel may have a cylindrical shape with a diameter at least greater than 1 meter.

The threads of the mandrel may be made of carbon or polyaramid.

The invention further relates to the use of the mandrel in accordance with the present invention for manufacturing, according to the filament winding technique, curved profiles made from stabilizable glass fiber-reinforced resin.

In this use, the profile may be stabilized by heating the mandrel after winding.

The invention also relates to a method for manufacturing, by filament winding, parts made from fiber-reinforced resin on a mandrel. In the method, the mandrel is designed to have a circumferential thermal expansion close to the thermal expansion of said fibers reinforcing said parts in a portion at least of the temperature range of use of said mandrel.

The portion of the temperature range may correspond to a temperature range of stabilization of the resin of said parts.

The structure of the mandrel may be such that the overall thermal expansion coefficient of the mandrel is close to the thermal expansion coefficient of the reinforcing fibers of the parts manufactured.

BRIEF DESCRIPTION OF THE DRAWINGS

Other features and advantages of the present invention will be clear from reading the description hereafter, given by way of non limitative particular examples, with reference to the accompanying drawings in which.

DESCRIPTION OF THE PREFERRED EMBODIMENTS

Figure 1:
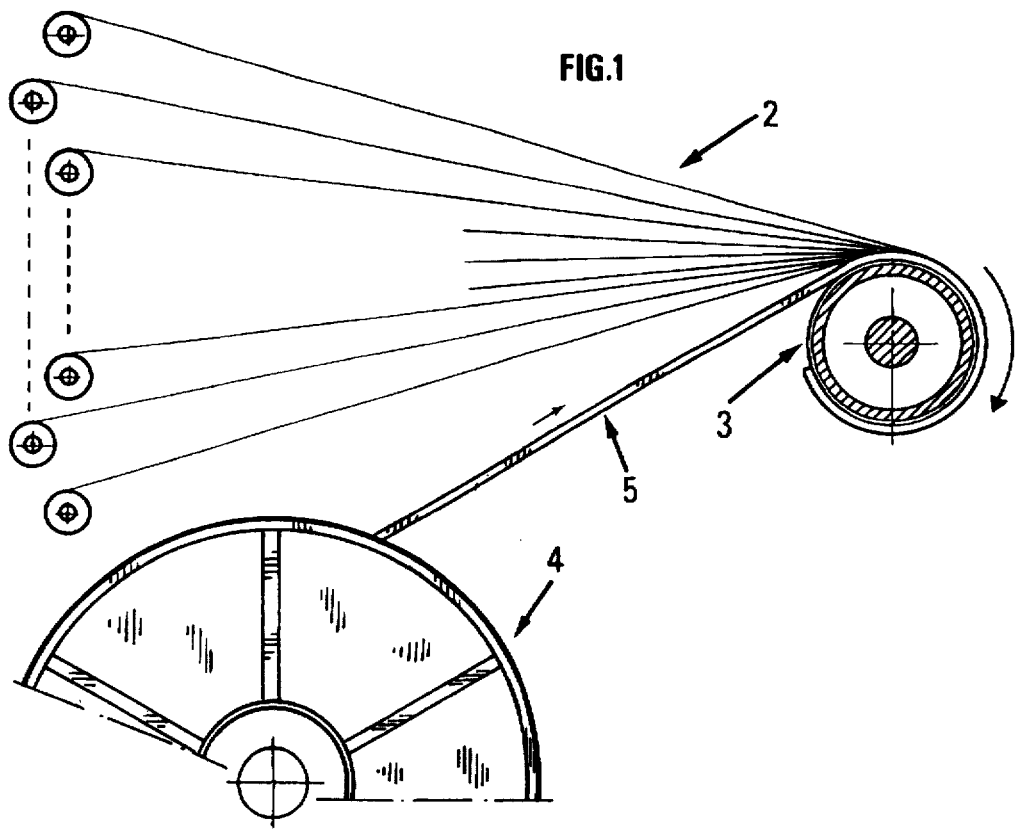
FIG. 1 diagrammatically shows an equipment including a mandrel according to the invention.

FIG. 1 shows reinforcing fibers 2 (for example glass threads, carbon threads, etc.) impregnated with a cross-linkable material such as, for example, an epoxy or a polyester resin, which are wound on a cylindrical mandrel 3 rotated about its longitudinal axis. These reinforcing fibers 2 are set in a helical groove of short pitch borne by mandrel 3.

The helical groove borne by mandrel 3 and receiving reinforcing fibers 2 preferably consists of a hollow profile 5 forming a mold, whose inner section corresponds to that of the profile to be obtained. This hollow profile 5 is continuously wound in contiguous turns on a smooth mandrel 3. The hollow profile may be made from a supple thermoplastic material (polyamide or PVC for example). This manufacturing mode thus allows the section of the product to be changed without replacing mandrel 3. The profile forming the mold is stored on a coil 4.

Figure 2A:
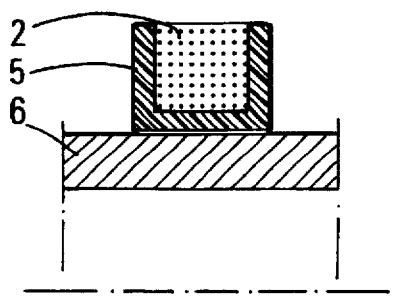
FIGS. 2A and 2B show partial cross-sections of the manufacturing of curved profiles according to the prior art, FIG. 3 also shows a partial cross-section of the mandrel according to the invention.

FIG. 2A shows a partial section of a mandrel 6 in accordance with the prior art, including a mold 5 in which the coated reinforcing fibers 2 are placed by winding according to FIG. 1. FIG. 2A shows mandrel 6 and mold 5 when they are at the room temperature, for example 20° C., of the room in which the winding equipment is located.

Figure 2B:
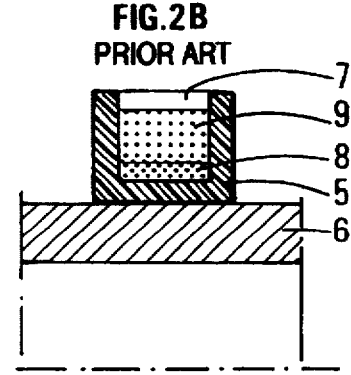

FIG. 2B shows, with some exaggeration for the purpose of the description, a partial section according to FIG. 2A when the mandrel is subjected to a temperature rise in order to stabilize the resin coating reinforcing fibers 2. The expansion coefficient of the mandrel, preferably made of steel is $11.10^{-6}$ °C.$^{-1}$, whereas the expansion coefficient of the glass fibers is $5.10^{-6}$.

When gelation of the profile in an oven, or any other process, is carried out at a temperature of 90° C., the mandrel expands radially by a value of $11.10^{-6}*(90-20)=770.10^{-6}$, which represents 0.54 mm for a 70-cm radius, whereas the glass fibers expand by $5.10^{-6}*(90-20)=350.10^{-6}$, which represents 0.24 mm for the same radius.

During the heating period, which lasts about one hour, the viscosity of the resin rises gradually, but it remains insufficient to act against a radial displacement of the fibers. The difference between the radial expansions of the mandrel according to the prior art and of the fibers, i.e. 0.3 mm, is found in the form of a layer of pure resin 7. One observes, at the bottom of the profile, a layer 8 of fibers deposited at the bottom and slightly overstrained, which corresponds to the differential stretch, and fibers which were previously located above and which have moved closer to the mold bottom (the mold bottom has actually moved up with the expansion of mandrel 6). In fact, the resin being not gelled yet, they have not tightened while remaining in place. Layer 9 remains substantially homogeneous.

The thickness of pure resin, proportional to the diameter of mandrel 6, could be disregarded as long as small diameter mandrels were used. With large diameter mandrels, for example 1.4 meter, this effect is no longer negligible. In fact, the bending modulus of a profile comprising such a pure resin layer is very markedly lower compared to a profile comprising a homogeneous fiber distribution.

One way of protection against this pure resin layer 7 at the profile surface, of the order of 0.3 mm, correlatively associated with a fiber-rich inner layer 8, consists in bringing the apparent expansion coefficient of the mandrel back to a value substantially equal to the expansion coefficient of fibers 2. The overall expansion of the mandrel will thus correspond practically to the longitudinal expansion of the fibers reinforcing the part.

Figure 3:
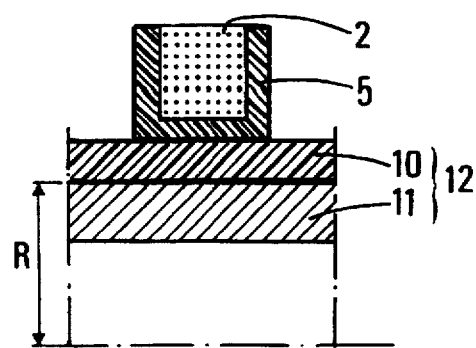

In a preferred embodiment this may be obtained, illustrated by FIG. 3, by covering a metallic support 11 making up the mandrel with a circumferential composite layer 10 consisting of polyaramid threads, such as Kevlar 49, manufactured by the Du Pont de Nemours Company, or carbon threads whose longitudinal linear expansion coefficient is slightly negative ($-0.7.10^{-6}$ for carbon and $-3.5.10^{-6}$ for Kevlar).

In order that the overall thermal expansion of mandrel 12 is substantially equal to that of fibers 2, the thermal stress levels in composite layer 10 and in the thickness of support 11 are so determined that the whole of the covered mandrel 12 answers this expansion condition. The thickness of layer 10 depends on the thickness of layer 11, on the radius R (FIG. 3) of the interface between the layers, on the moduli of the composite of layer 10 and of layer 11, on the expansion coefficient of layer 11, on that of the threads of composite layer 10 and on that of the reinforcing fibers 2 making up the part in mold 5.

An example is presented hereafter, in which fibers 2 used for manufacturing the parts are made from glass and support 11 is made from steel.

The circumferential composite 10 covering the steel layer 11 may be a composite with about 65% of fibers with respect to the coating resin, and said resin may be all those commonly used with the following fibers:

Kevlar 49 manufactured by the Du Pont de Nemours Company, constituting a composite having substantially a 90 GPa modulus, HR carbon such as the T 300 manufactured by the Toray Company, constituting a composite having substantially a 150 GPa modulus, HM carbon, such as the M46J manufactured by the Toray Company, constituting a composite having substantially a 250 GPa modulus.

If we take:

$\alpha_v$ as the expansion coefficient of the glass ($5.10^{-6}$ C.$^{-1}$), $\alpha_c$ as the expansion coefficient of the composite ($-3.5.10^{-6}$ C.$^{-1}$ for Kevlar, $-0.7.10^{-6}$ C.$^{-1}$ for carbon), $\alpha_a$ as the expansion coefficient of the steel ($11.10^{-6}$ C.$^{-1}$), $\sigma_c$ as the stress in the composite, $\sigma_a$ as the stress in the steel, $E_c$ as the modulus of the composite, $E_a$ as the modulus of the steel (200 000 MPa)

$d_v$ as the natural expansion of the glass, $d_c$ as the natural expansion of the composite, $d_a$ as the natural expansion of the steel, $\epsilon_c$ as the mechanical stretch of the composite, $\epsilon_a$ as the mechanical stretch of the steel, $e_c$ as the thickness of the composite, $e_a$ as the thickness of the steel.

$\Delta t$ as the temperature variation between the room temperature and the gelling temperature of the profile-shaped part, the natural expansion of the glass is: $d_v = \alpha_v . \Delta_t$, the natural expansion of the composite is: $d_c = \alpha_c . \Delta_t$, the natural expansion of the steel is: $d_a = \alpha_a . \Delta_t$, In order that the overall expansion of the hooped mandrel is equal to that of the glass, therefore that the steel layer is compressed by the difference between its natural expansion and the longitudinal expansion of the glass, the composite layer has to impose thereon a mechanical stretch $\epsilon_a$ (negative since it is in compression) equal to said difference between its natural expansion and the longitudinal expansion of the glass. The hooping composite layer will be tightened by the difference between the longitudinal expansion of the glass and its natural expansion (in absolute value, the shortening will be added):

$$\epsilon_a = -(d_a - d_v) = (\alpha_v - \alpha_a)\Delta_t, \ \epsilon_c = d_v - d_c = (\alpha_v - \alpha_c).\Delta_t$$

The equilibrium of stresses will be expressed by the fact that the external pressure $P_e$ imposed by the hooping composite layer on the steel tube is the opposite (equal in absolute value, but having unlike signs) of the internal pressure $P_i$ imposed by the steel tube on the composite layer, at the surface of contact (of radius R) of these two layers. As they are thin tubes, we may put:

$$P_i = \sigma_a . e_a / R \quad P_e = \sigma_c . e_c / R$$

and, given that $$P_i = -P_e$$

it may be deduced that $$\sigma_c . e_c = -\sigma_a . e_a$$

hence $$e_c = -e_a . \sigma_a / \sigma_c$$

now $$\sigma_c = E_c . \epsilon_c \text{ and } \sigma_a = E_a . \epsilon_a$$

and therefore $$e_c = -e_a . (E_a / E_c) . ((\alpha_v - \alpha_a) / (\alpha_v - \alpha_c)).$$

Numerically, if we assume by first approximation that the expansion coefficient of the composite is equal to that of the fiber, we obtain the table hereunder:

|  | Kevlar | HR carbon | HM carbon |
|---|---|---|---|
| $E_c$ MPa | 90 000 | 150 000 | 250 000 |
| $E_a/E_c$ | 2.222 | 1.333 | 0.8 |
| $\alpha_v - \alpha_a$ | $-6 \cdot 10^{-6}$ | $-6 \cdot 10^{-6}$ | $-6 \cdot 10^{-6}$ |
| $\alpha_c$ | $-3.5 \cdot 10^{-6}$ | $-0.7 \cdot 10^{-6}$ | $-0.7 \cdot 10^{-6}$ |
| $\alpha_v - \alpha_c$ | $8.5 \cdot 10^{-6}$ | $5.7 \cdot 10^{-6}$ | $5.7 \cdot 10^{-6}$ |
| $e_c/e_a$ | 1.57 | 1.40 | 0.84 |
| composite thickness for 5 mm steel for a 10-m long mandrel | 7.84 mm | 7.02 mm | 4.21 mm |

The present invention also applies to the manufacture of tubes, preferably of large diameter, made from a composite material, by winding reinforcing fibers on a mandrel such as that described here. In fact, it is obvious that the mold 5 of FIG. 3 can be suppressed without changing the solution provided by the preferred embodiment of the present invention.

Tubes manufactured by means of the mandrel or of the process according to the invention will be made up of a composite of homogeneous reinforcing fibers and resin distribution, giving the tubes good fatigue and aging strength characteristics.

The invention is not limited by the example described. The manufacturing method may in fact be applied with all the advantages cited by using a mandrel fulfilling the desired purposes with other close or equivalent means.

I claim:

1. A cylindrical mandrel assembly having an axis of rotation, for manufacturing, by filament winding, parts made from resin reinforced with glass reinforcing fibers, wherein said mandrel assembly comprises a steel support directly covered by a composite material layer including threads arranged substantially circumferentially with respect to the axis of rotation of said mandrel assembly, said composite layer having a thickness according to the formula $$e_c = -e_a \cdot (E_a/E_c) \cdot ((\alpha_v - \alpha_a)/(\alpha_v - \alpha_c)),$$

wherein $e_c$ is the thickness of the composite;

wherein $e_a$ is the thickness of steel;

wherein $E_a$ is the modulus of steel;

wherein $E_c$ is the modulus of the composite;

wherein $\alpha_v$ is the expansion coefficient of glass;

wherein $\alpha_c$ is the expansion coefficient of the composite; and, wherein $\alpha_a$ is the expansion coefficient of steel, an open mold in surrounding contact with said mandrel assembly, said resin reinforced with said glass reinforcing fiber being disposed in said open mold, said mandrel assembly having an overall circumferential thermal expansion coefficient substantially equal to the thermal expansion coefficient of said reinforcing fibers.

2. A mandrel as claimed in claim 1, wherein said mandrel assembly has a diameter greater than 1 meter.

3. A mandrel assembly as claimed in claim 1, wherein said threads of the composite material layer of the mandrel assembly are made from carbon or polyaramid, the metallic support is steel and the reinforcing fibers are glass.

4. A method of manufacturing, according to the filament winding technique, curved profiles made from a glass fiber-reinforced stabilized resin, the improvement comprising winding filaments on a mandrel assembly according to claim 1.

5. A method as claimed in claim 4, wherein said profile is stabilized by heating the mandrel assembly after winding.

6. A mandrel assembly according to claim 5, wherein said mandrel assembly has a diameter greater than 1 meter.

7. A mandrel assembly according to claim 1, wherein said composite material layer is non-segmented.

8. A method of manufacturing by filament winding on a mandrel, parts made from resins reinforced with reinforcing fibers, comprising: determining a coefficient of thermal expansion of the reinforcing fibers at an operating temperature wherein the mandrel is in use, and providing said mandrel with materials of construction having thermal properties such that a circumferential coefficient of thermal expansion of the mandrel as a whole at said operating temperature is substantially equal to said coefficient of thermal expansion of said reinforcing fibers at said operating temperature.

9. A method as claimed in claim 8, wherein said portion of said operating temperature corresponds to a temperature range of stabilization of the resin of said parts.

10. A method according to claim 8, wherein the mandrel comprises a metallic support having a coefficient of thermal expansion and a composite outer surface having a thickness and a coefficient of thermal expansion, and further comprising adjusting said thickness of said composite layer so as to yield said mandrel having an overall circumferential coefficient of thermal expansion substantially equal to said coefficient.

11. A mandrel assembly according to claim 10, wherein said composite outer surface is non-segmented.

12. A mandrel according to claim 11, wherein said mandrel has a diameter greater than 1 meter.

13. A mandrel assembly having an axis of rotation for manufacturing, by filament winding, parts made from resin reinforced with fibers having a thermal expansion coefficient, said mandrel assembly comprising:

a metal support;

a circumferential composite layer directly covering said metal support; and wherein said mandrel assembly has a thermal expansion that is substantially equal to the thermal expansion of the reinforcing fibers.

14. A mandrel assembly according to claim 13, wherein said composite layer comprises carbon threads or polyaramid threads having a negative longitudinal linear expansion coefficient.

15. A mandrel assembly according to claim 13, wherein said reinforcing fibers are glass fibers; said expansion coefficient of said reinforcing fiber is $\alpha_v$; said metal support is made of steel having a thickness of $e_a$, a modulus of $E_a$, and a thermal expansion coefficient of $\alpha_a$; said composite layer has an expansion coefficient of $\alpha_c$, a modulus of $E_c$, and said composite layer has a thickness defined by the following equation $$e_c = -e_a \cdot (E_a/E_c) \cdot ((\alpha_v - \alpha_a)/(\alpha_v - \alpha_c)).$$

16. A mandrel assembly according to claim 15, wherein said composite layer comprises carbon threads or polyaramid threads having a negative longitudinal linear expansion coefficient.

17. A mandrel assembly according to claim 16, wherein said circumferential composite material layer is non-segmented.

18. A mandrel assembly according to claim 17, wherein said mandrel assembly has a diameter greater than 1 meter.

* * * * *